B. F. AMOS.
SADDLETREE.
APPLICATION FILED OCT. 18, 1907.
914,546.
Patented Mar. 9, 1909.
2 SHEETS—SHEET 1.
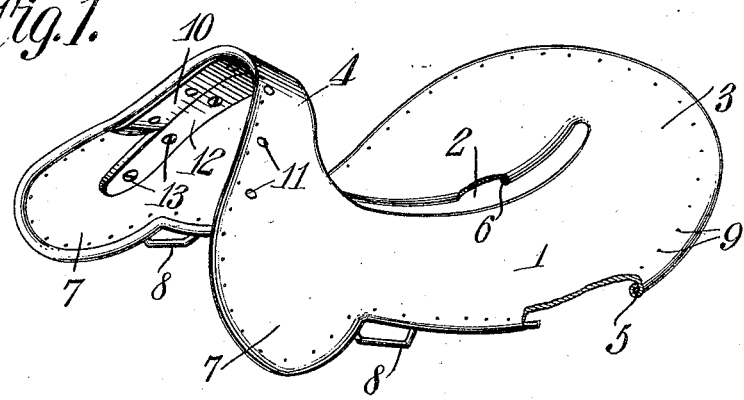
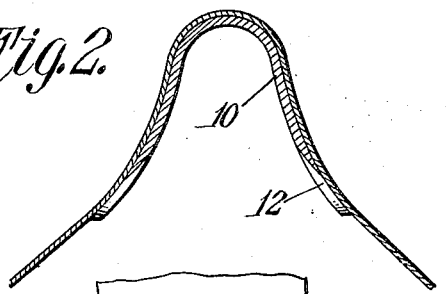
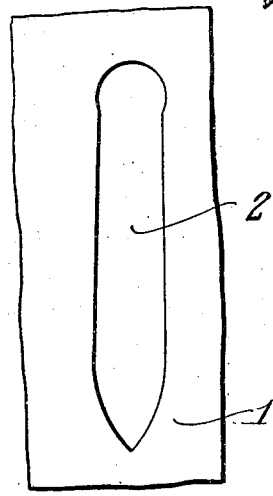
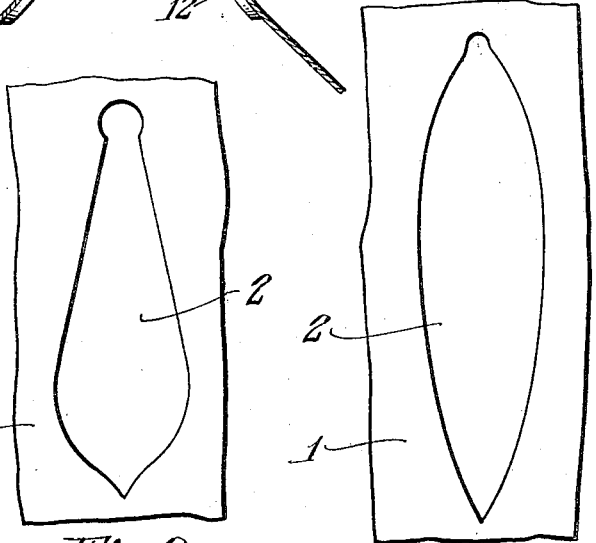
Inventor,
Benjamin F. Amos.
Witnesses:
By C. A. Snow & Co.
Attorneys.
THE NORRIS PETERS CO., WASHINGTON, D. C.

B. F. AMOS.
SADDLETREE.
APPLICATION FILED OCT. 18, 1907.
914,546.
Patented Mar. 9, 1909.
2 SHEETS—SHEET 2.
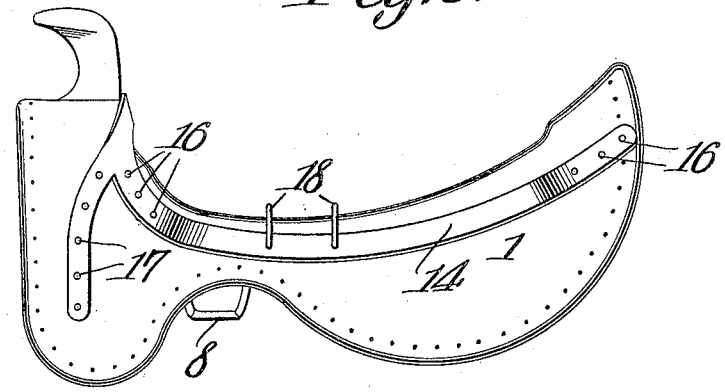
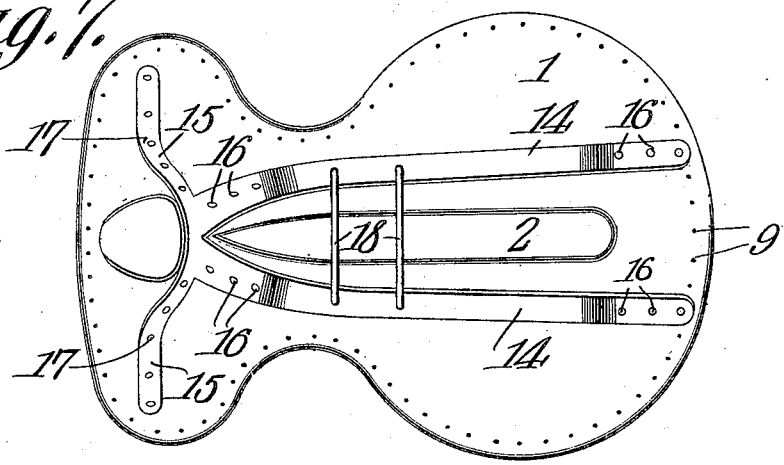
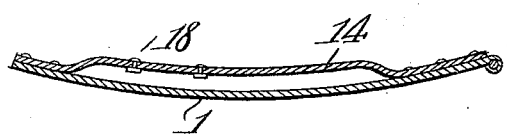
Witnesses:
Inventor,
Benjamin F. Amos.
By
Attorneys.

UNITED STATES PATENT OFFICE.

BENJAMIN F. AMOS, OF ROCKY HILL STATION, KENTUCKY.

SADDLETREE.

No. 914,546.  Specification of Letters Patent.  Patented March 9, 1909.

Application filed October 18, 1907. Serial No. 398,084.

*To all whom it may concern:*

Be it known that I, BENJAMIN F. AMOS, a citizen of the United States, residing at Rocky Hill Station, in the county of Edmonson and State of Kentucky, have invented a new and useful Saddletree, of which the following is a specification.

This invention relates to saddle trees.

The object of the invention is, in a novel manner, practically to dispense with the employment of wood in the construction of such articles, and in lieu thereof to employ metal, whereby the resulting article will be more durable, more comfortable, and cheaper to manufacture than the ordinary wooden tree in common use. Furthermore, to employ a novel means whereby to cause the tree to conform to the backs of horses of different shapes, thus to insure comfort to both the rider and to the animal.

With the above and other objects in view, as will appear as the nature of the invention is better understood, the same consists, generally stated, in a saddle tree constructed wholly of resilient metal stamped or otherwise formed to the proper contour, and provided along its perimeter and the walls of the ridge slot with a reinforcing wire by which is held assembled with the tree by turning or beading the metal thereof around the wire. The ridge slot, which is provided to relieve the ridge of the horse's back from contact with the saddle and also for the purpose of ventilation and of adding to the comfort of both the horse and rider, will determine the contour of the tree, and will thus permit the latter to be properly shaped to fit a horse of any build.

In addition to the features of novelty above enumerated, the tree has combined with it, as by being riveted thereto, girth loops which are also adapted for connection with the stirrup straps, and in order to cause the tree to possess sufficient rigidity to prevent undue yielding and at the same time to render it responsive to pressure, the pommel has combined with it, in any preferred manner, an arch plate which is disposed on the interior of the pommel, and is thus shielded from view, and will be prevented from causing the saddle cover to have a bulge apparent at the pommel, which frequently occurs with ordinary saddles where the arch plate is disposed exteriorly of the pommel.

Further and more specific details of construction will be hereinafter fully described and claimed.

In the accompanying drawings, forming a part of this specification, and in which like characters of reference indicate corresponding parts, Figure 1 is a view in perspective, partly in section, of a metallic saddle tree constructed in accordance with the present invention. Fig. 2 is a transverse sectional view taken through the pommel and the jockeys. Figs. 3, 4 and 5 are fragmentary detail views of the seat portion of the tree displaying various shapes of ridge slots that may be employed to impart different contours to the seat and cantle of the tree. Fig. 6 is a view in side elevation of a modified form of invention. Fig. 7 is a top plan view thereof. Fig. 8 is a view in longitudinal section through the seat.

The tree, shown in Fig. 1, is constructed from sheet metal of any preferred character and is stamped or otherwise formed to the proper shape. The seat 1 of the tree is provided with a longitudinally disposed ridge slot 2 that extends from the cantle 3 to the pommel 4. This slot will be shaped according to the form of the animal in connection with which the saddle will be used, and will determine the lines of the seat portion, cantle, and pommel. Thus, for example, if the flanks of the animal be thin, the ridge slot, shown in Fig. 3, will be employed which will permit the seat of the tree to be formed on more pronounced curves than if the form of slot, shown in Fig. 4, were employed. Again, if the horse's shoulders and hips be broad, the form of ridge slot shown in Fig. 5 will be employed, as it will be apparent that when the flank portions are formed to shape, that the seat portion will be transversely curved on relatively short lines, while the cantle and pommel portions will be curved on longer lines. In order to reinforce the tree against yielding, the margin thereof, as well as the walls of the ridge slot have combined with them reinforcing wires 5 and 6 respectively, which are held assembled with the parts with which they co-act by bending or beading the metal thereof around them, as clearly as shown in Fig. 1. The tree is finished with the usual jockeys or wings 7, and at, or adjacent to their points of juncture with the seat portion of the tree, girth loops 8 are provided which may be held assembled with the tree in any preferred manner as by being riveted or brazed thereto.

To facilitate the attaching of the cover and pad to the tree, spaced orifices 9 are provided around the tree, adjacent to its perimeter and within the line of the reinforcing wire, 5, to receive tacks, nails or stitching threads.

Secured to the interior of the pommel adjacent to the forward margin thereof is a metallic arch plate 10 which, in this instance, is shown and held assembled with the pommel by rivets 11. This arch plate as usual will not only serve to strengthen the pommel against yielding or flattening but will also impart resiliency thereto which will materially add to the comfort of the ride. Arranged back of the arch plate in this instance, although if preferred, it may be arranged in front of it, is a strip of wood 12, which is held assembled with the tree by screws or rivets 13 and is provided for the purpose of furnishing a means of attachment of the cover with the tree as by being tacked thereto.

In addition to rendering the tree easier to the animal, as by providing a seat to receive the ridge of his back, the ridge slot 2 will also permit ventilation, and may be covered with any suitable material to prevent perspiration working through to the trousers of the rider. The usual thickness of the cantle of the tree can be produced by the addition of any suitable material before the top cover is put on, and as this forms no part of the present invention, detailed illustration thereof is omitted. It may be stated, however, that by the provision of the orifices 9, that the top cover may be either stitched to the tree or be riveted thereto as may be preferred.

As a feature of further improvement, the tree may have combined with it cushioning members to provide an easy spring-acting seat for a rider. These members consist, as shown in Figs. 6, 7 and 8, of two strips 14 of resilient metal that extend from points adjacent to the rim of the cantle to a point adjacent to the pommel, and there merges into a third member or strip 15 that is bent around the pommel and extends downward along the jockeys and terminates at points adjacent to the margins thereof. The members 14 are secured to the tree, near their terminals by rivets 16, their intermediate portions being bowed away from the tree, as shown in Fig. 8, in order to secure the desired spring action. The member 15 is secured to the jockeys near its terminals by rivets 17, and its intermediate portion will preferably be bowed away from the pommel in the same manner and for the same purpose as the members 14. To prevent spreading of the members 15, they may, if desired, be connected intermediate of their ends by a plurality of resilient wires or bars 18, the ends of which are secured in any preferred manner to the members.

The improvements last described are displayed as employed in connection with a horned or stock saddle tree, but it is to be understood that they are equally adaptable for use in connection with the tree shown in Fig. 1, and as such application will be obvious, detailed illustration thereof is deemed unnecessary.

The advantage accruing from the employment of an all-metallic tree over an ordinary wooden tree or one composed partly of wood and partly of metal is that it is lighter, cheaper, more durable, easier to manufacture, and capable with greater facility of being properly shaped to the form of the animal, also to meet any particular demand of the rider.

Having thus fully described the invention what is claimed is:—

1. As a new article of manufacture, a saddle tree composed wholly of metal and provided with a ridge slot of a shape to determine the longitudinal and transverse curves of the seat portion of the tree.

2. As a new article of manufacture, a saddle tree composed wholly of metal and provided with a ridge slot, the shape of which will determine the longitudinal and transverse curves of the seat portion of the tree, the perimeter of the tree and of the walls of the slot being reinforced, and the tree being provided adjacent to its perimeter with orifices to receive the fastening means employed to attach the cover to the tree.

3. As a new article of manufacture, a saddle tree composed wholly of metal and provided with a ridge slot the shape of which will determine the longitudinal and transverse curves of the seat portion of the tree, and cushioning members extending from the cantle to the pommel of the tree contiguous to the slot and bowed away from the tree.

4. As a new article of manufacture, a saddle tree composed wholly of metal and provided with a ridge slot the shape of which will determine the longitudinal and transverse curves of the seat portion of the tree, and cushioning members extending from the cantle to the pommel thereof, contiguous to the walls of the slot, and thence continued along the jockeys to points adjacent to their margins.

5. As a new article of manufacture, a saddle tree composed wholly of metal and provided with a ridge slot, the shape of which will determine the longitudinal and transverse curves of the seat portion of the tree, cushioning members extending from the cantle to the pommel thereof, contiguous to the walls of the slot, and thence continued along the jockeys to points adjacent to their margins, and means bridging the ridge slot and secured to the cushioning members to reinforce the latter against spreading.

In testimony that I claim the foregoing as my own, I have hereto affixed my signature in the presence of two witnesses.

BENJAMIN F. AMOS.

Witnesses:
Q. B. FORD,
R. C. HARDISON.